March 25, 1941.   D. H. BOWDER   2,236,207
CLASP
Filed Jan. 3, 1940
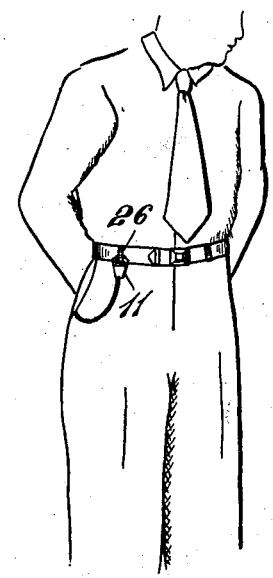
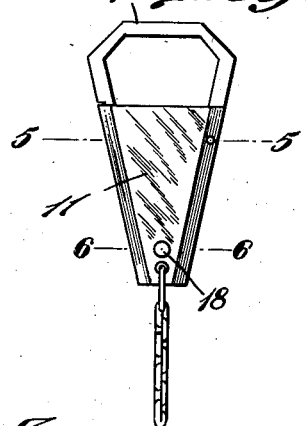
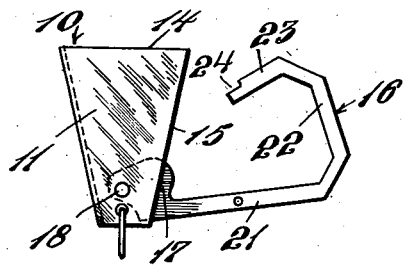
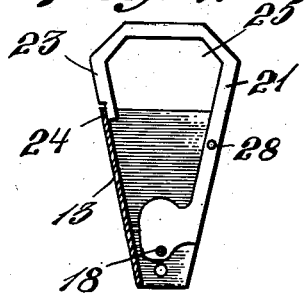
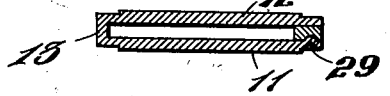
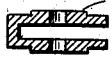
INVENTOR.
David Harold Bowder
BY Barlow & Barlow
ATTORNEYS.

Patented Mar. 25, 1941

2,236,207

UNITED STATES PATENT OFFICE 2,236,207

CLASP

David Harold Bowder, Attleboro, Mass., assignor to Swank, Inc., a corporation of Delaware Application January 3, 1940, Serial No. 312,239

2 Claims. (Cl. 24—232)

This invention relates to a clasp, more particularly designed for attachment to a belt loop of trousers for connection of a key chain thereto, although it may have various other uses.

One object of the invention is to provide an extremely simple construction which may be formed of a minimum number of parts, each of which may be provided by machine operations for assembly with the minimum amount of labor.

Another object of this invention is to provide a device which may be easily secured in locked relation and firmly held in such locked relation until it is desired that the parts become unlocked for detachment from the part to which it is locked.

Another object of this invention is to provide two parts hinged together, one of which may be a hook, which parts may be relatively swung in one direction to a locked closed position.

With these and other objects in view, the invention consists of certain novel features of construction, as will be more fully described, and particularly pointed out in the appended claims.

In the accompanying drawing:

Fig. 1 is a perspective view indicating one location on the clothing to which the device may be attached;

Fig. 2 is a plan view of the clasp in closed position;

Fig. 3 is a plan view of the clasp with the parts swung to open position;

Fig. 4 is a view similar to Fig. 2 with the front wall of one of the members removed, showing the side wall in section;

Fig. 5 is a sectional view on line 5—5 of Fig. 2;

Fig. 6 is a sectional view on line 6—6 of Fig. 2; and

Fig. 7 is a view similar to Fig. 2 and illustrating the outside member alone.

In the use of a key chain or a chain to which other implements may be attached, such for instance, as a knife, it is desirable to easily and yet securely fasten one end of the chain to the clothing. A convenient place for such attachment is the belt loop; and in order to provide a simple clasp for attachment to the belt loop for releasably securing the end of a key chain thereto, I have provided two members, one of which members is folded from sheet stock and the other member is formulated into hook shape, and I have pivoted these members together so that the members may be swung to expose the hook that it may be placed about the belt loop on the trousers and then closed and locked in such closed position; and the following is a more detailed description of the present embodiment of this invention, illustrating the preferred means by which these advantageous results may be accomplished:

With reference to the drawing, 10 designates generally the outer body member of the clasp provided with a front wall 11 and a back wall 12 both of which are generally triangular in shape with a connecting side wall 13 extending along and joining the parallel edges along one side of the front wall 11 and back wall 12. There is no bridging portion between the top edges 14 of the walls of the member 10 or along the sides 15 of the walls of the member 10, thus forming generally a channel or U-shaped member 10 and into which other parts may be placed through the open edges 14 or 15 thereof.

This member 10 is of resilient stock, such for instance as metal, so that if the side walls 11 and 12 are sprung apart, particularly along their unattached edges 15 of the member 10, they will spring back into place.

The other member of the clasp designated generally 16 is also of a shape and size to conform over a portion of its area to the member 10. This member 16 is of skeleton formation having a pivoting end portion 17 which is located between the front and back walls 11 and 12 to receive a pivot pin 18 therethrough, which is riveted over as at 19 and 20 to hold the members 10 and 16 in pivotal relation. The thickness of the member 16 is such as to slidingly although snugly fit between the side walls 10 and 11.

This member 16 also has a shank 21 which is of a length to extend lengthwise beyond the member 10 and then change its direction to form a hook 22 with the terminal portion 23 returning into the member 10 and extending along the side wall 13 with the end of this terminal portion 23 notched as at 24 to receive the side wall 13, as clearly shown in Fig. 4. The direction of these portions 21 and 23 is such as to extend the line of the opposite edges of the member 10 whereby it conforms in general appearance thereto, while at the same time providing by reason of the flaring portions 21 and 23 an enlarged opening or loop 25 for the reception of the belt loop 26, as illustrated in Fig. 1.

The front and back walls may be raised as at 27, and these may be suitably ornamented or embellished, such for instance as by engraving thereon the initials of the user.

It will be apparent that when the members are moved to the position illustrated in Fig. 3, the belt loop may be inserted over the end of the hook and then these members moved to the telescoping position illustrated in Figs. 2 and 4, to close the hook.

In order that the hook may be firmly secured in this closed position, I have provided a recess 28 in the shank 21 of the member 16 and I have provided a projection 29 along the front wall 11 of the member 10 so located that when the members are in the closed position, this detent will snap into the recess and firmly hold the parts in such closed position, the sheet stock of the member 10 which is folded up in position being such as to provide a very strong frictional grip upon the member 16 by reason of the interfitting relation of the detent in one and the recess in the other of the members.

The foregoing description is directed solely towards the construction illustrated, but I desire it to be undertood that I reserve the privilege of resorting to all the mechanical changes to which the device is susceptible.

I claim:

1. A clasp comprising a body member having spaced back and front walls of generally triangular shape connected along one edge by a side wall, the other side and the upper end of said body member being open along their entire extent to provide an entrance passage between them for the reception of a hook member, and a hook member of generally triangular shape located between said side walls and pivoted near to the apexes thereof for lateral swinging movement to and from a closed position between said side walls through the open side and end of said body member, an attaching eye spaced from said pivot, said hook member being cut away to clear said eye during a portion of its swing and then abutting the eye and being of skeleton shape and of a length so as to extend beyond the body member when in closed telescoped position in said body member to provide a loop having an enlarged polygonal opening bounded by outwardly flaring side portions which extend outwardly from the open upper end of said body member in a direction in line with the tapered side edges of the back and front walls of the body member.

2. A clasp comprising a body member having spaced back and front walls of generally triangular shape connected along one edge by a side wall, the other side and the upper end of said body member being open along their entire extent to provide an entrance passage between them for the reception of a hook member, and a hook member of generally triangular shape located between said side walls and pivoted near to the apexes thereof for lateral swinging movement to and from a closed position between said side walls through the open side and end of said body member, an attaching eye spaced from said pivot, said hook member being cut away to clear said eye during a portion of its swing and then abutting the eye and being of skeleton shape and of a length so as to extend beyond the body member when in closed telescoped position in said body member to provide a loop having an enlarged polygonal opening bounded by outwardly flaring side portions which extend outwardly from the open upper end of said body member in a direction in line with the tapered side edges of the back and front walls of the body member, said opening of the loop being of greater width crosswise of the hook than its width on a line axially of the body member, the terminal end of said hook being exposed when the hook member is turned into open position and when in closed position and in telescoping relation in the body member the terminal end of the hook extends into the open upper end of the body member along its side wall.

DAVID HAROLD BOWDER.